Oct. 23, 1923.
C. T. HOWSON
1,471,663
COFFEE ROASTER
Filed Aug. 9, 1921
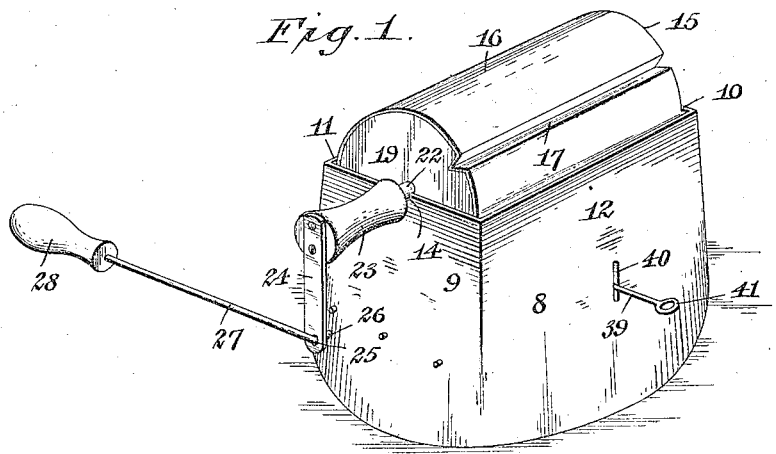
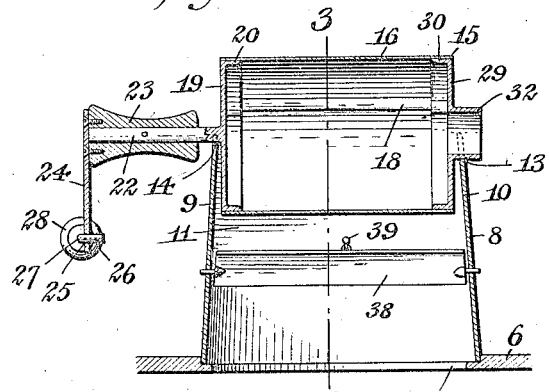
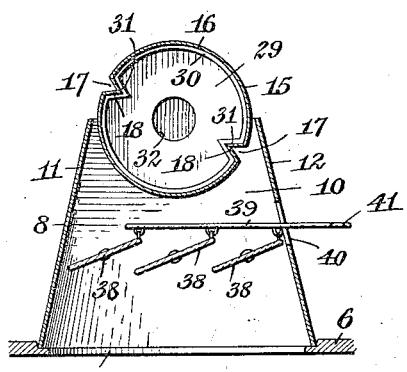
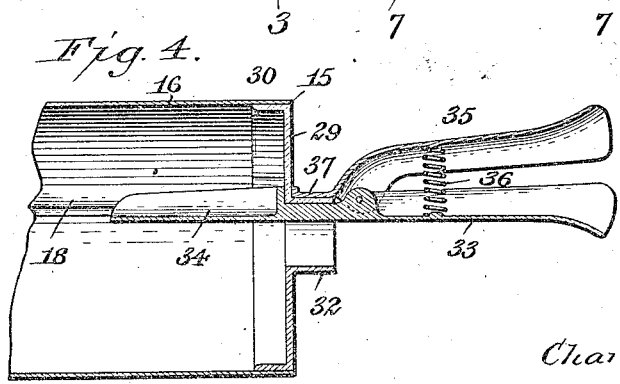
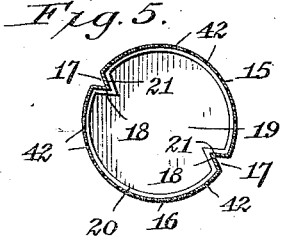
Inventor:
Charles T. Howson,
By Emil Neubach
Attorney
Witness:
J. J. Oberst, Patented Oct. 23, 1923.

1,471,663

UNITED STATES PATENT OFFICE.

CHARLES T. HOWSON, OF SILVER CREEK, NEW YORK.

COFFEE ROASTER.

Application filed August 9, 1921. Serial No. 490,869.

*To all whom it may concern:*

Be it known that I, CHARLES T. HOWSON, a citizen of the United States, residing at Silver Creek, in the county of Chautauqua and State of New York, have invented certain new and useful Improvements in Coffee Roasters, of which the following is a specification.

My invention relates to a coffee roaster, and it has for one of its objects, the provision of a roaster which is adapted for home use and in which a small quantity of coffee may be roasted on an ordinary cooking stove.

Another object of my invention is the provision of a simple, inexpensive and easily operated roaster provided with simple means to govern the heat, and also with simple means for agitating the coffee so that the coffee beans will be roasted uniformly.

With the above and other objects in view. the invention consists in the novel features of construction, and in the arrangement and combination of parts to be hereinafter described and more particularly pointed out in the subjoined claims.

In the drawings:—

Fig. 1 is a perspective view of the complete roaster.

Fig 2 is a central longitudinal section through the same.

Fig. 3 is a transverse section through the same, taken on line 3—3, Fig. 2.

Fig. 4 is a longitudinal section through a portion of the roasting drum showing an implement in connection therewith for conveniently removing the drum from its support or chamber.

Fig. 5 is a transverse section through the drum, taken in a plane indicated by line 3—3, Fig. 2, looking toward the left; the drum, however, being shown with its cylindrical wall perforated.

The reference numeral 6 designates the top of a stove or similar heating apparatus provided with a griddle opening 7 over which my improved roaster is adapted to be seated.

The roaster comprises a sheet metal support in the form of a heating chamber 8 which is cylindrical at its lower end and rectangular at its upper end. The upper portion of this chamber may therefore be said to have end walls 9, 10, and side walls 11, 12, the corners of which merge into and vanish at the cylindrical lower portions of the chamber. The end wall 10 has a concaved seat 13 at its upper end which serves as a bearing, and a similar but smaller concaved notch or seat 14 serving as a bearing is provided at the upper end of the end wall 9.

15 designates the roasting drum which, as shown in Figs. 1 to 4, has an imperforate cylindrical wall 16 provided at diametrically opposite points with external V-shaped longitudinal depressions 17, said depressions forming internal elongated V-shaped ribs 18 which serve as agitators for the coffee beans placed within the drum. One end of the drum is closed by a head 19 having an inwardly-directed flange 20 provided at diametrical opposite points with V-shaped notches or depressions 21 adapted to receive the ribs 18 of the cylindrical wall 16. The head 19 is preferably cast and the flange 20 is adapted to fit into the end of the cylindrical wall 16. Said head has an integral shaft 22 extending outwardly therefrom, which shaft is journaled in the seat or bearing 14. Pinned or otherwise secured to said shaft is a wooden handle 23 having preferably a concaved exterior to permit of conveniently lifting the drum when placing the same into the heating chamber 8, or removing the same therefrom.

24 designates a crank arm which is secured to the end of the wooden handle 23 and at its outer end it is provided with an opening 25 into which the bent end 26 of an actuating rod 27 is adapted to be passed, said rod having a wooden handle 28 at its outer or free end.

At the opposite end of the cylindrical wall a head 29 is provided which is also equipped with a cylindrical inwardly-directed flange 30 having V-shaped notches 31 at diametrically opposite points, said notches receiving the V-shaped ribs 18 of the cylindrical wall 16. Said head 29 has a tube 32 axially thereon which is of a diameter considerably larger than that of the shaft 22. This tube serves as a journal for the drum and is seated in the seat or bearing 13 in the end wall 10. The tube 32 opens into the drum and permits a spoon or other suitable implement to be inserted into the drum for removing a quantity of coffee to determine the condition of the same. For this purpose, however, I prefer to employ a special implement, such as shown in Fig. 4, and which comprises an elongated member 33 having a spoon or ladle 34 at one end and a clamp 35 pivotally secured thereto between its ends. A spring 36 is inserted between the elongated member and the handle of the clamp to hold the clamping end 37 of said clamp against said elongated member, or, when said clamp is in use, against the tube 32, as clearly shown in Fig. 4. In this manner the implement serves as a handle which can be conveniently taken hold of, and when grasping the wooden handle 23 at the opposite end of the drum, the latter may be easily lifted from the heating chamber or as readily placed in position in said heating chamber.

The heat from the stove will enter the heating chamber 8 and may be regulated by means of a series of dampers or shutters 38 pivotally secured to opposite end walls and arranged so that when in one position, they overlap and practically close the upper portion of the heating chamber from the lower portion. These dampers or shutters are pivotally connected to an adjusting rod 39, which extends out through a slot 40 in the side wall 12 of the heating chamber, the outer end thereof having a handle 41 for conveniently adjusting the same. By moving said adjusting rod 39 inwardly, the dampers or shutters 38 will be swung on their pivots and provide openings to enable the heat to pass upwardly and come in contact with the drum 15. The size of the openings between the dampers or shutters may be regulated at will, or they may be completely closed by pulling out the adjusting rod 39 to its full extent.

In Fig. 5 I have shown the cylindrical wall of the drum perforated, as at 42, as it may in some instances be found desirable to admit the heat into the drum.

The heads 19 and 29 are removably held within the ends of the cylindrical portion of the drum and they are made so that the flanges thereof snugly fit into the cylindrical wall 16. The ribs 18 on the cylindrical wall, when entered in the notches 21 and 31 of the heads, will cause the cylindrical wall to rotate with said heads.

In order to rotate said drum, the handle of the actuating rod 27 is taken hold of and the crank moved in a circle, with the result that the drum will rotate on its journals formed by the shaft 22 and tube 32. The use of the actuating rod 27 permits the drum to be rotated without subjecting the hand of the operator to the heat rising from the stove. During the rotation of the drum, a portion of the coffee will be carried upwardly by each of the ribs 18 during each revolution of the drum, and as the ribs reach a high point, the coffee will drop down to the bottom of the drum; thus all coffee beans within the drum will be subjected to an equal degree of heat and assurance be had that the coffee will be uniformly roasted.

During the roasting operation, the spoon end 34 of the special implement shown in Fig. 4, may be inserted through the tube 32 to take out a quantity of coffee for ascertaining the condition of the same, and when completely roasted, said implement may be clamped onto the tube in the manner shown in Fig. 4, and the drum lifted out of the heating chamber by means of the handle 23 and said implement.

In order to remove the coffee from the drum or insert the coffee into the same, either head may be removed from the cylindrical fall or, if desired, the coffee may be removed from the drum or inserted thereinto through the tube 32.

Having thus described my invention, what I claim is:—

1. A coffee roaster, comprising a heating chamber having a cylindrical lower end and a rectangular upper end whose corners merge into and vanish at said cylindrical lower end, a rotatable drum positioned at least in part within said chamber and journaled in opposite walls at the upper end of said chamber.

2. A coffee roaster, comprising a heating chamber having a cylindrical lower end and a rectangular upper end and having bearings at the upper ends of opposite walls, the corners of said rectangular upper end vanishing at the cylindrical lower end, a cylindrical drum journaled in said bearings, a crank for rotating said drum, and a detachable actuating rod applied to said crank.

3. A coffee roaster, comprising a heating chamber having a cylindrical lower end and rectangular upper end whose corners merge into and vanish at said cylindrical lower end, bearings in opposite walls at the upper end of said chamber, a rotatable drum journaled in said bearings and extending partly into said chamber and partly outside of said chamber, a plurality of dampers pivotally secured to opposite walls of said heating chamber between said drum and the cylindrical lower end of said chamber, and an actuating rod pivotally connected to said dampers and extending outwardly through an opening in said heating chamber.

4. A coffee roaster, comprising a heating chamber, a drum comprising a cylindrical wall and heads removably inserted into opposite ends of said cylindrical wall, one of said heads having a shaft axially thereon and the other head having an axial tube, said shaft and tube serving as alined bearings for said drum, and means for rotating said shaft.

5. A coffee roaster having a drum comprising a cylindrical wall provided with external V-shaped depressions extending from end to end thereof and forming internal V- shaped ribs, and removable heads provided with V-shaped notches adapted to receive said V-shaped ribs.

6. A coffee roaster having a drum comprising a cylindrical wall provided with internal ribs and removable heads provided with peripheral notches adapted to receive said ribs.

7. In a coffee roaster, a drum having a cylindrical wall provided with external V-shaped depressions extending from end to end thereof and forming internal V-shaped ribs, and removable heads closing opposite ends of said cylindrical wall and having inwardly-directed flanges provided with V-shaped notches adapted to receive said V-shaped ribs.

8. A coffee roaster, comprising a heating chamber adapted to be placed on a stove and having a cylindrical lower portion and a rectangular upper portion whose walls merge into said cylindrical portion, opposite walls of said rectangular upper portion having concaved notches, one of said notches being smaller than the other, a drum having a shaft extending axially from one end thereof journaled in the smaller of said notches and a tube extending from the other end thereof journaled in the larger of said notches, and means for rotating said drum.

9. A coffee roaster, comprising a heating chamber having bearings in opposite walls at the upper end thereof, a drum having a shaft extending axially from one end thereof and a tube extending axially from the other end thereof and opening into said drum, a handle secured to said shaft, and an implement clamped to said tube to serve as a handle to permit the removal of said drum from said heating chamber.

10. A coffee roaster comprising a heating chamber having bearings in opposite walls at its upper end, a drum having a shaft extending axially from one end thereof and a tube extending axially from the other end thereof and opening into said drum, a handle secured to said shaft, and an implement applied to said tube and extending into said drum, said implement having a ladle at its inner end within said drum to receive coffee during the rotation of the drum, said implement being removable to examine the coffee deposited on said ladle.

In testimony whereof I affix my signature.

CHARLES T. HOWSON.